United States Patent
Jhawar et al.

(10) Patent No.: US 11,074,292 B2
(45) Date of Patent: Jul. 27, 2021

(54) VOICE TAGGING OF VIDEO WHILE RECORDING

(71) Applicant: RealWear, Inc., Vancouver, WA (US)

(72) Inventors: Sanjay Subir Jhawar, Menlo Park, CA (US); Christopher Iain Parkinson, Richland, WA (US); Tom Dollente, Milpitas, CA (US)

(73) Assignee: REALWEAR, INC., Vancouver, WA (US)

( * ) Notice: Subject to any disclaimer, the term of this patent is extended or adjusted under 35 U.S.C. 154(b) by 70 days.

(21) Appl. No.: 16/230,650

(22) Filed: Dec. 21, 2018

(65) Prior Publication Data

US 2019/0205340 A1 Jul. 4, 2019

Related U.S. Application Data

(60) Provisional application No. 62/611,895, filed on Dec. 29, 2017.

(51) Int. Cl.
*G06F 16/78* (2019.01)
*G10L 15/22* (2006.01)
(Continued)

(52) U.S. Cl.
CPC ....... *G06F 16/7867* (2019.01); *G02B 27/017* (2013.01); *G02B 27/0179* (2013.01);
(Continued)

(58) Field of Classification Search
CPC ...... G02B 2027/0138; G02B 2027/014; G02B 27/017; G02B 27/0179; G06F 16/7867;
(Continued)

(56) References Cited

U.S. PATENT DOCUMENTS 8,922,481 B1 * 12/2014 Kauffmann ............. G06F 3/017
345/156
10,180,572 B2 * 1/2019 Osterhout .......... G02B 27/0093
(Continued)

OTHER PUBLICATIONS

International Preliminary Report on Patentability received for PCT Patent Application No. PCT/US2018/067542, dated Jul. 9, 2020, 6 pages.

*Primary Examiner* — Gelek W Topgyal
(74) *Attorney, Agent, or Firm* — Shook, Hardy & Bacon L.L.P.

(57) ABSTRACT

Aspects of the technology described herein allow a user to add tags to a video as the video is being recorded. The tags can be added by capturing the user's voice as the video is recorded. Aspects can be performed by a head-mounted display. The head-mounted display can include an augmented reality display. In one aspect, a list of tags are displayed. The tags can be selected from a curated list of tags associated with a project the user is filming. For example, a project could comprise a building inspection during construction. In another aspect, the most commonly used tags in a given context can be shown. The most commonly used tags associated with a particular context can be determined through machine learning process. At a high level, a machine learning process can sort through historical tag data and associated contexts to determine a pattern correlating a context to a tag.

18 Claims, 11 Drawing Sheets

(51) Int. Cl.
*G02B 27/01* (2006.01)
*G06N 20/00* (2019.01)
*G06F 3/16* (2006.01)

(52) U.S. Cl.
CPC ............. *G06F 3/167* (2013.01); *G06N 20/00* (2019.01); *G10L 15/22* (2013.01); *G02B 2027/014* (2013.01); *G02B 2027/0138* (2013.01); *G10L 2015/223* (2013.01)

(58) Field of Classification Search
CPC ......... G06F 3/167; G06N 20/00; G10L 15/22; G10L 2015/223
See application file for complete search history.

(56) References Cited

U.S. PATENT DOCUMENTS

| | | | | |
|---|---|---|---|---|
| 10,539,787 | B2* | 1/2020 | Haddick | G02B 27/017 |
| 2002/0069072 | A1* | 6/2002 | Friedrich | G05B 19/41875 |
| | | | | 704/275 |
| 2011/0187640 | A1* | 8/2011 | Jacobsen | G06F 3/167 |
| | | | | 345/156 |
| 2011/0246482 | A1* | 10/2011 | Badenes | G06F 16/955 |
| | | | | 707/748 |
| 2014/0285521 | A1* | 9/2014 | Kimura | G06F 3/147 |
| | | | | 345/633 |
| 2016/0104511 | A1* | 4/2016 | An | H04N 1/212 |
| | | | | 386/241 |
| 2016/0283455 | A1* | 9/2016 | Mardanbegi | G10L 15/26 |
| 2017/0206509 | A1* | 7/2017 | Beyk | G06Q 10/20 |

* cited by examiner

VOICE TAGGING OF VIDEO WHILE RECORDING

CROSS-REFERENCE TO RELATED DOCUMENTS

This application claims the benefit of priority to U.S. Provisional Application No. 62/611,895, filed Dec. 21, 2017, titled "Voice Tagging of Video While Recording," the entirety of which is hereby incorporated by reference.

BACKGROUND

Mobile computing devices, such as mobile phones or head-mounted displays, provide users with robust technologies that are portable and capable of performing a variety of tasks, such as recording video. Videos can be tagged for voice control playback and other purposes. Typically, tagging is a manual process that occurs after a video has been recorded. For example, the user may record a video of a home with a cell phone at home. Subsequently, the user may download the video to a laptop and add tags for different rooms in the home. Tags may be used for a number of purposes, such as annotating a video as it is replayed or as points to snap the video to upon selection of a tag.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Aspects of the technology described herein allow a user to add tags to a video as the video is being recorded. The tags can be added by capturing the user's voice as the video is recorded. A trigger word, such as "tag," can be used to activate the tag function. For example, a user could say, "start tag, living room fireplace inspection" to insert a tag. The start method command in conjunction with the tag command can be used to tag a duration of video. In this example, upon completing a recording of the fireplace inspection the same user could say, "stop tag" to mark the end of the section. An alternative tag method is a point-in-time tag that could be created by the command "insert tag living room maintenance." The point in time tag is associated with a single progress point in the video recording.

Aspects of the technology described herein can be performed by a head-mounted display. The head-mounted display can include an augmented reality display. In one aspect, a list of tags are displayed through the augmented reality display. The tags can be selected from a curated list of tags associated with a project the user is filming. For example, a project could comprise a building inspection during construction. The project could be specific to a particular building or generally applicable to any building inspection. If specific to a building, the curated tags could be organized to include groups for each room in the building. The tags could include areas or features the building inspector should identify in each room. In one aspect, location information for the recording device can be used to select relevant tags, such as those in a room or area of the building in which the user is currently standing. In this way, the suggested tags can also act as a workflow or checklist for the inspection project.

In another aspect, for example in the generic project the scenario, the most commonly used tags in a given context can be shown. The most commonly used tags associated with a particular context can be determined through machine learning process. At a high level, a machine learning process can sort through historical tag data and associated contexts to determine a pattern correlating a context to a tag.

BRIEF DESCRIPTION OF THE DRAWINGS

The present invention is described in detail below with reference to the attached drawing figures, wherein.

DETAILED DESCRIPTION

Figure 1:
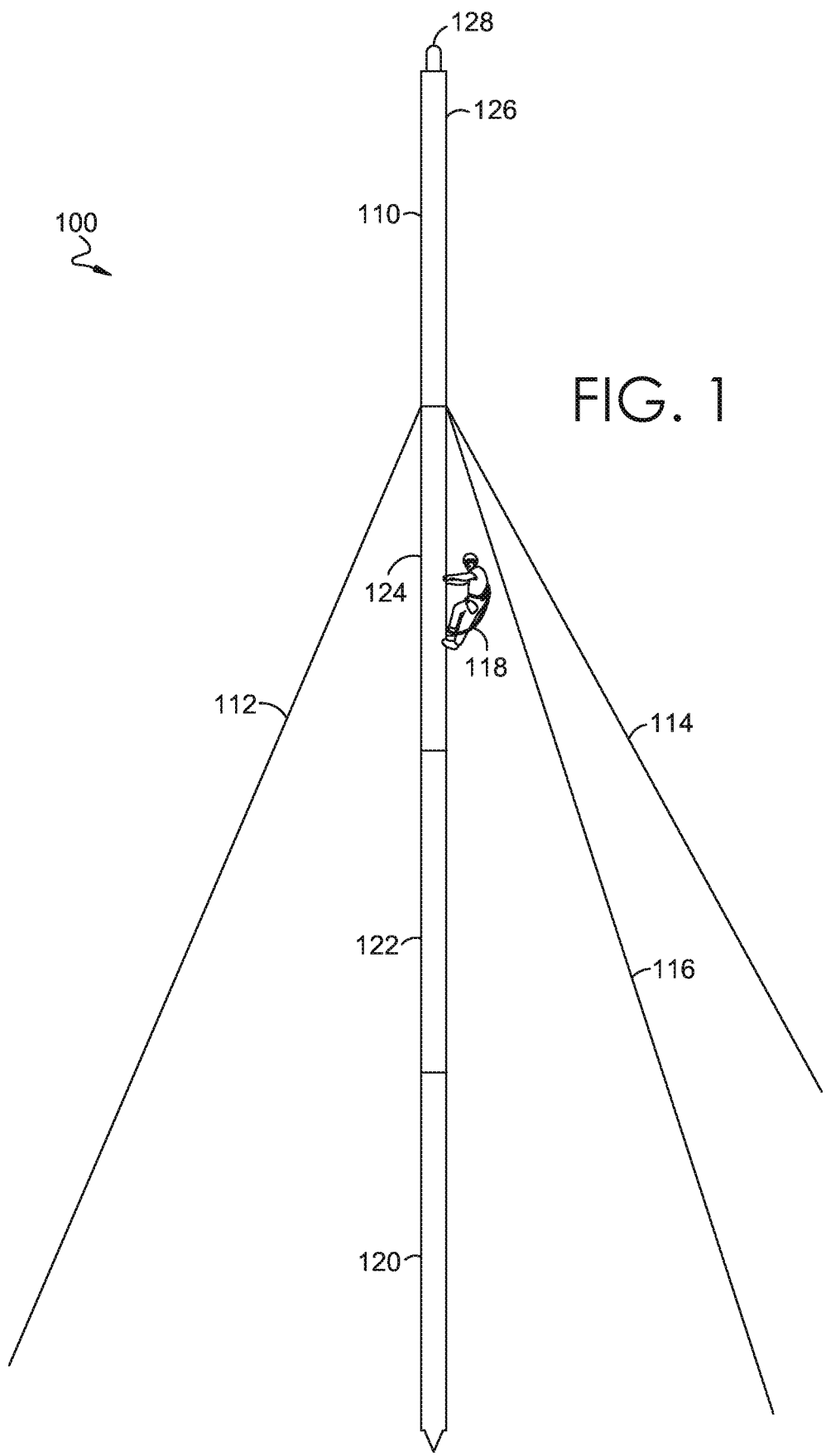
FIG. 1 is a diagram illustrating a possible application where live audio tagging can be implemented as a video is recorded, in accordance with some implementations of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the technology described herein allow a user to add tags to a video as the video is being recorded. The tags can be added by capturing the user's voice as the video is recorded. A trigger word, such as "tag," can be used to activate the tag function. For example, a user could say, "start tag, living room fireplace inspection" to insert a tag. The start method command in conjunction with the tag command can be used to tag a duration of video. In this example, upon completing a recording of the fireplace inspection the same user could say, "stop tag" to mark the end of the section. An alternative tag method is a point-in-time tag that could be created by the command "insert tag living room maintenance." The point in time tag is associated with a single progress point in the video recording. The words "interest" and "start" can be described herein as tagging method commands In one aspect, the tags are saved and metadata file associated with the video.

The tags are time coded according to a progress point in a video recording. A video progress point is measured from the starting point to a point in the video in units of time, such as seconds. Accordingly, a video that has been recording for 45 minutes and 30 seconds has a progress point of 45 minutes and 30 seconds.

In one aspect, the technology avoids having the audible tags recorded in the audio associated with the video. In one aspect, a tag command doubles as a start recording command. In this aspect, speaking the tag command could start the video recording with a brief delay, such as five seconds. The stop tag command could stop the recording. In another aspect, on-the-fly video editing occurs to delete the portion of video that includes the tag command.

In one aspect, images are captured to depict a scene being captured by a camera when the tag command is given. The tag is then associated with the captured image. The images may be captured through a second camera on a capture device, such as a head-mounted display, or through the video camera. In one aspect, the image is just a single frame of the video that is copied from the recorded video. The same tag may be associated with both a video and an image. In one aspect, tags can be annotated Aspects of the technology described herein can be performed by a head-mounted display. The head-mounted display can include an augmented reality display. In one aspect, a list of tags are displayed through the augmented reality display. The tags can be selected from a curated list of tags associated with a project the user is filming. For example, a project could comprise a building inspection during construction. The project could be specific to a particular building or generally applicable to any building inspection. If specific to a building, the curated tags could be organized to include groups for each room in the building. The tags could include areas or features the building inspector should identify in each room. In one aspect, location information for the recording device can be used to select relevant tags, such as those in a room or area of the building in which the user is currently standing. In this way, the suggested tags can also act as a workflow or checklist for the inspection project.

In another aspect, for example in the generic project the scenario, the most commonly used tags in a given context can be shown. The most commonly used tags associated with a particular context can be determined through machine learning process. At a high level, a machine learning process can sort through historical tag data and associated contexts to determine a pattern correlating a context to a tag.

Figure 2:
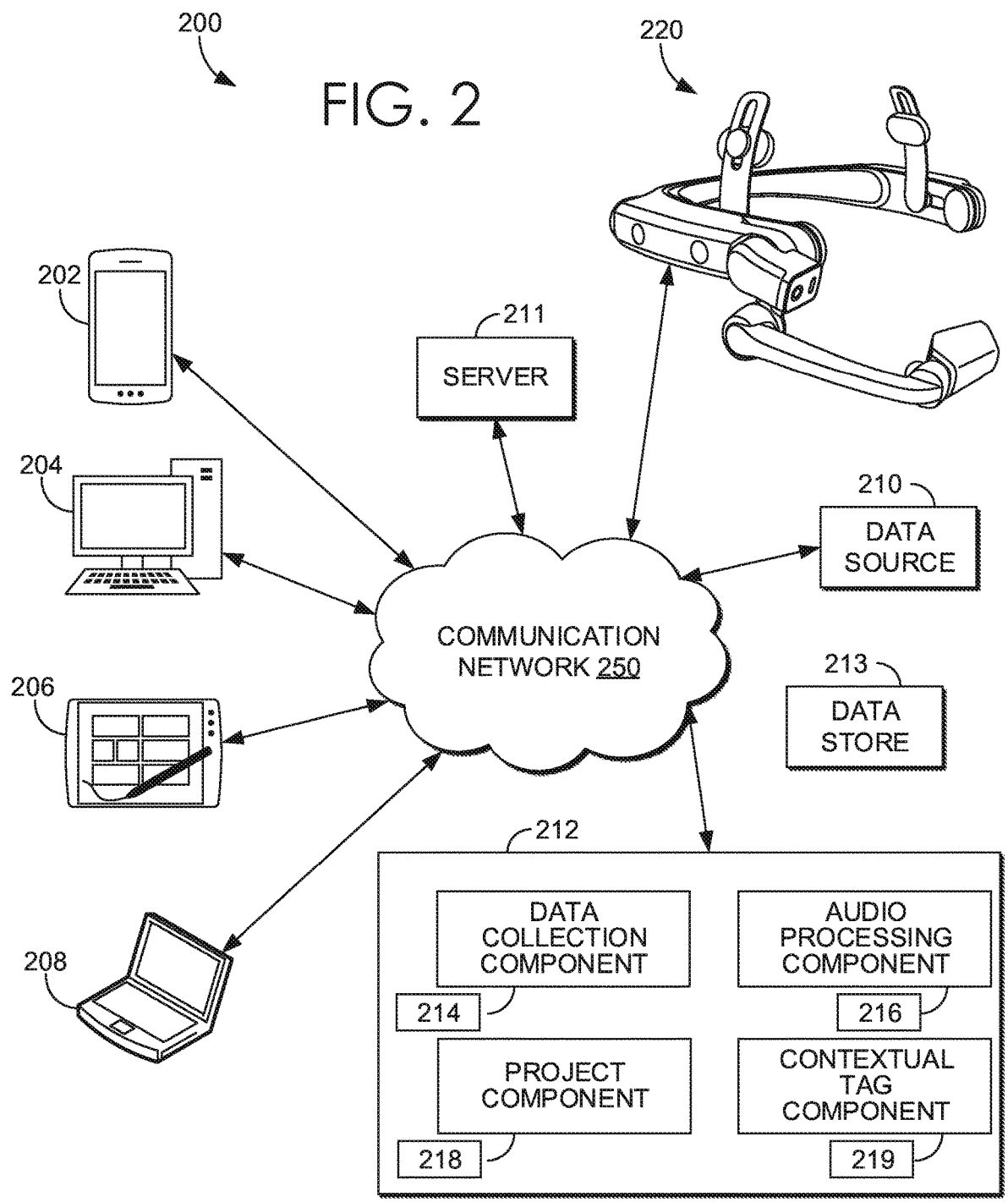
FIG. 2 is a block diagram illustrating an exemplary computing environment, in accordance with some implementations of the present disclosure.

Turning now to FIG. 1, an inspection environment 100 comprising a radio tower 110 being inspected by an inspector 118 who is wearing a head-mounted display that captures video of the inspection. The radio tower 110 comprises four sections. The bottom section 120 the lower middle section 122, the upper middle section 124, and the upper section 126, the tower is topped by a light 128. The tower is supported by guy wires 112, 114, and 116. The inspector 118 can issue audible tagging commands as the inspection progresses. In one aspect, suggested tags can be displayed as the inspector 118 climbs the tower 110. The tags can be selected based on context, such as previous tags received, present elevation, and orientation of the device. Each elevation could be associated with one or more tags. Similarly, the orientation could also be associated with tags. For example, a junction box or other tower component could be inspected, and therefore a video recording made, from multiple orientations. The tags could be prepared in advance on a computing device, such as shown in FIG. 2, and then transferred to the recording device. In addition, the recording device can work with other devices to perform the tagging and identify relevant tags.

Looking now to FIG. 2, FIG. 2 provides a block diagram showing an exemplary operating environment 200 for audio tagging a video captured by a computing device (e.g., a wearable device) in accordance with some implementations of the present disclosure. Environment 200 includes user devices, a data source 210, a server 211, and a tag engine 212. The user computing devices include, but are not limited to smartphone 202, desktop 204, tablet 206, laptop 208, and a wearable device, such as head-mounted display (HMD) device 220 and several computing. Other user devices (not shown), which may work with environment 200 include: a smart watch, a virtual reality headset, augmented reality glasses, an MP3 player, a global positioning system (GPS) or device, a video player, a handheld communications device, a vehicle computer system, an embedded system controller, a workstation, or any combination of these delineated devices, or any other suitable device. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Figure 3:
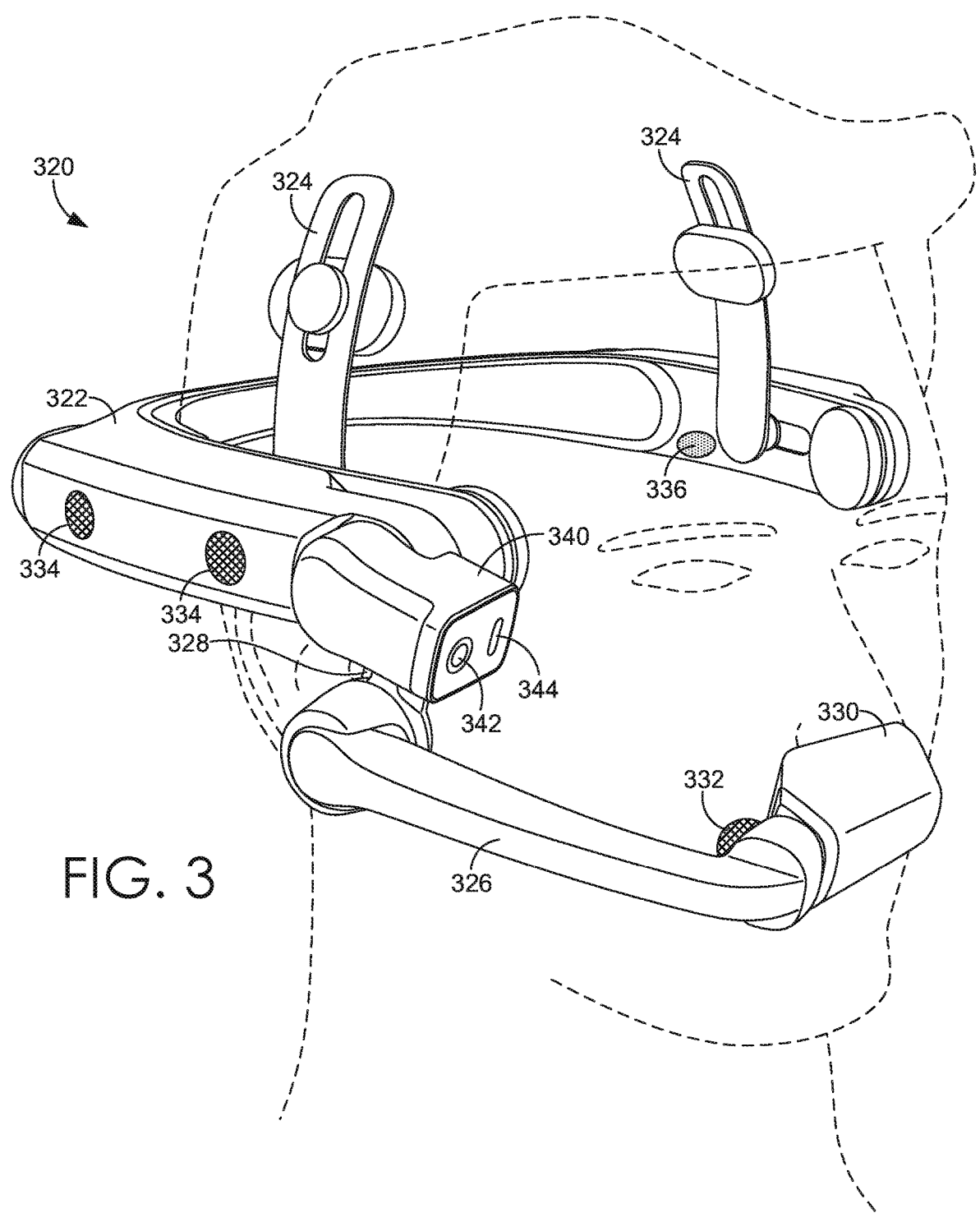
FIG. 3 is an illustration of an exemplary head-mounted display device, in accordance with some implementations of the present disclosure.
Figure 4A:
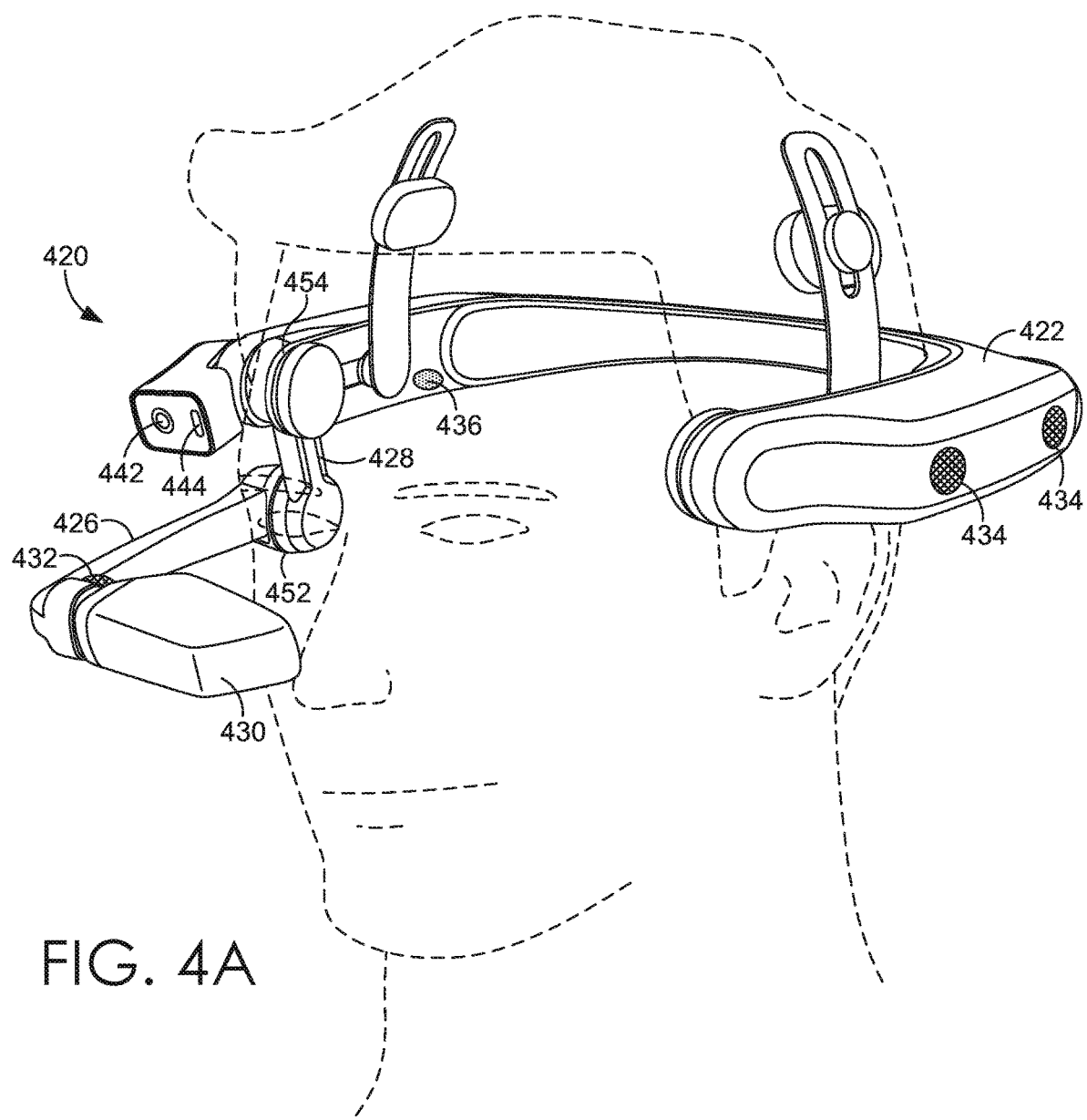
FIG. 4A is an illustration of an exemplary head-mounted display device, in accordance with some implementations of the present disclosure.
Figure 4B:
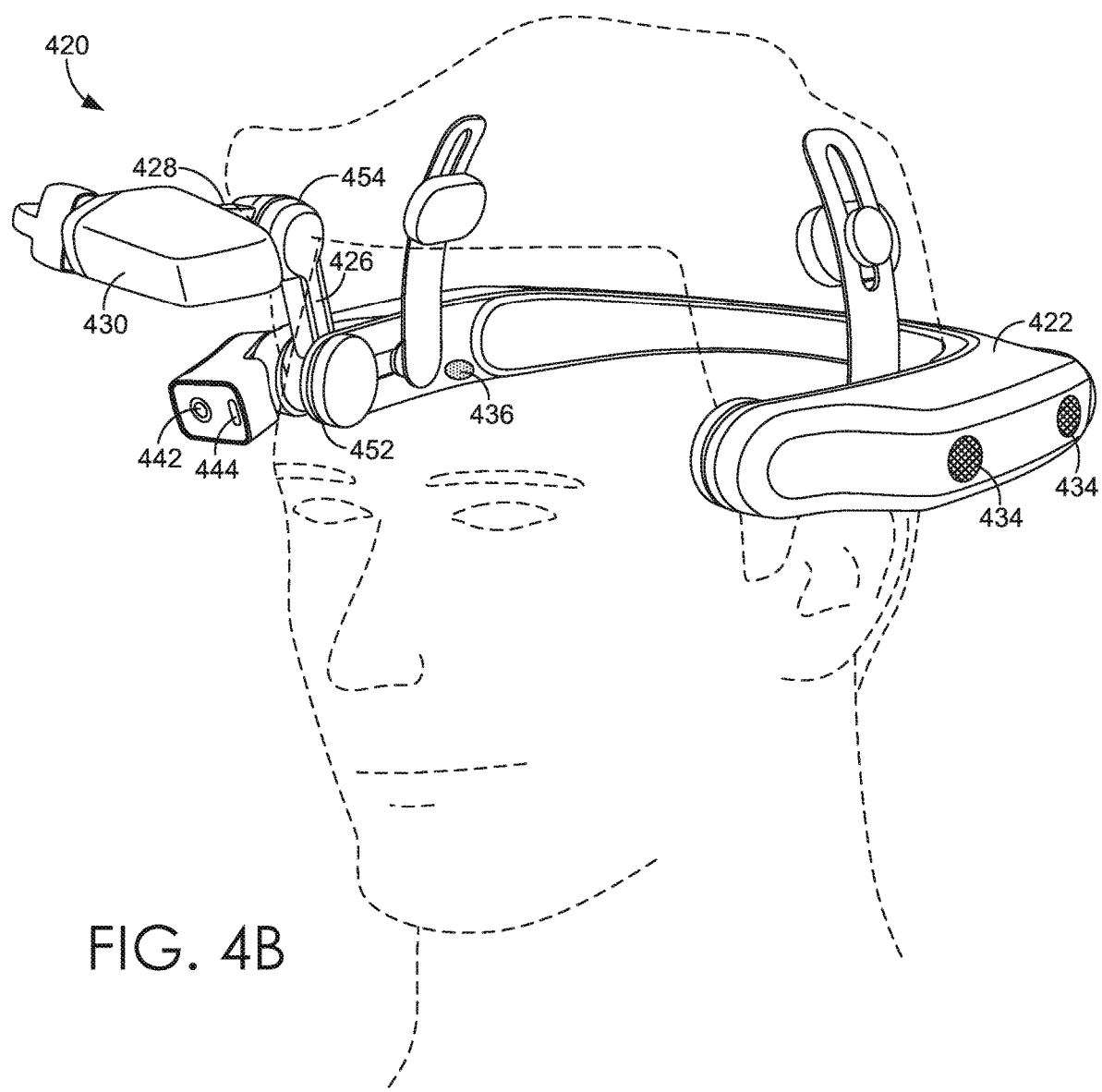
FIG. 4B is an illustration of an exemplary head-mounted display device, in accordance with some implementations of the present disclosure.

Various embodiments of HMD device 220 are discussed in conjunction with at least FIGS. 3, 4A, and 4B. However, briefly here, HMD device 220 is a wearable computing device that provides computing and communication capabilities to the wearer. In the non-limiting body shown in FIG. 2, a wearable device (e.g. HMD device 220) may be worn about the head of the user, such as inspector 218.

The HMD device 220 can include but is not limited to, any mobile computing device, wearable computing device, or computing device, a conventional or modified computing framework including, but not limited to, an operating system, hardware components, resource stacks and/or drivers associated with the hardware components, applications for execution on the operating system, and the like.

User devices can be client devices on the client-side of operating environment 200, while server 211 can be on the server-side of operating environment 200. The user devices can send and receive communications, including video and images, project information, tag collections, and tags. The user devices can be a source of user information, such as a location information (e.g., GPS), calendar information, tag information, and such. Server 211 can comprise server-side software designed to work in conjunction with client-side software on the user devices to implement any combination of the features and functionalities discussed in the present disclosure. For example, the server 211 may run a tagging engine, such as engine 212. This division of operating environment 200 is provided to illustrate one example of a suitable environment, and there is no requirement for each implementation that any combination of server 211 and user devices remain as separate entities.

Data sources 210 may comprise data sources and/or data systems, which are configured to make data available to any of the various constituents of operating environment 200. (For example, in one aspect, data sources 210 provides (or make available for accessing) tag or project data to data collection component 214 of FIG. 2 or HMD device 220.) Data sources 210 may be discrete from the user devices, including HMD device 220 and server 211 or may be incorporated and/or integrated into at least one of those components. In one aspect, data sources 210 comprise one or more sensors, which may be integrated into or associated with one or more of the user device(s) or server 211. Examples of sensed user data made available by data sources 210 are described further in connection to data collection component 214. The data sources 210 can comprise a knowledge base that stores information about a venue, a user, a device, a project, a group of users, or other information related to tagging a video.

Environment 200 additionally includes a communication network, such as but not limited to communication network 210, which can communicatively couple each of user computing devices 202-208 and HMD device 220. Communication network 250 may be any communication network, including virtually any wired and/or wireless communication technologies, wired and/or wireless communication protocols, and the like. It should be understood that communication network 250 may be virtually any network that communicatively couples at least one of user computing devices 202-208 with a wearable device, such as but not limited to HMD device 220.

The tag engine 212 can provide a list of relevant tags for a given context. The tag engine 212 is shown as a separate entity, but can be integrated with any other entity shown, including HMD device 220. In aspects, portions of the tag engine 212 can reside on the server 211, which can be in communication with other components and devices over the communication network 250. In one aspect, the tag engine resided on the server 211 and communicates tags to the HMD 220 in real-time or in advance of a video recording project undertaken by a user of the HMD 220.

The tag engine 212 includes a data collection component 214, an audio processing component 216, a project component 218, and a contextual tag component 219. These components may be embodied as a set of compiled computer instructions or functions, program modules, computer software services, or an arrangement of processes carried out on one or more computer systems, such as computing device 1000 described in connection to FIG. 10, for example In particular, such applications, services, or routines may operate on one or more user devices, may be distributed across one or more user devices and servers, or be implemented in the cloud. Moreover, in some aspects, these components of system 200 may be distributed across a network, including one or more servers (such as server 211) and client devices (such as HMD device 220), in the cloud, or may reside on a user device. Moreover, these components, functions performed by these components, or services carried out by these components may be implemented at appropriate abstraction layer(s), such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some aspects functionality of these components can be shared or distributed across other components.

The data collection component 214 collects data that can be used to recommend relevant tags to the user. Data collection component 214 is generally responsible for accessing or receiving (and in some cases also identifying) tag data and contextual data from one or more data sources, such as data sources 210. In some aspects, data collection component 214 may be employed to facilitate the accumulation of data of one or more users (including crowdsourced data) for contextual tag component 219. The data may be received (or accessed), and optionally accumulated, reformatted, and/or combined, by data collection component 214 and stored in one or more data stores, such as data store 213, where it may be available to contextual tag component 219.

Tag data may be received from a variety of sources where the data may be available in a variety of formats. For example, in some aspects, data received via data collection component 214 may be determined via one or more sensors, which may be on or associated with one or more user devices (such as HMD 220), servers (such as server 211), and/or other computing devices. As used herein, a sensor may include a function, routine, component, or combination thereof for sensing, detecting, or otherwise obtaining information and may be embodied as hardware, software, or both. By way of example and not limitation, data may include data that is sensed or determined from one or more sensors (referred to herein as sensor data), such as location information of mobile device(s), smartphone data (such as phone state, charging data, date/time, or other information derived from a smartphone), user-activity information (for example: app usage; online activity; searches; voice data such as automatic speech recognition; activity logs; communications data including calls, texts, instant messages, and e-mails; website posts; other user data associated with communication events; etc.) including user activity that occurs over more than one user device, user history, session logs, application data, contacts data, calendar and schedule data, notification data, user-account(s) data (which may include data from user preferences or settings associated with a personal assistant application or service), global positioning system (GPS) data, vehicle signal data, traffic data, weather data (including forecasts), wearable device data, other user device data (which may include device settings, profiles, network connections such as Wi-Fi network data, or configuration data, data regarding the model number, firmware, or equipment, device pairings, such as where a user has a mobile phone paired with a Bluetooth headset, for example), gyroscope data, accelerometer data, other sensor data that may be sensed or otherwise detected by a sensor (or other detector) component including data derived from a sensor component associated with the user (including location, motion, orientation, position, user-access, user-activity, network-access, user-device-charging, or other data that is capable of being provided by one or more sensor component), data derived based on other data (for example, location data that can be derived from Wi-Fi, cellular network, or IP address data), and nearly any other source of data that may be sensed or determined as described herein. In some respects, data may be provided in data streams or signals. A "signal" can be a feed or stream of data from a corresponding data source. For example, a signal could be from a smartphone, a home-sensor device, a GPS device (e.g., for location coordinates), a HMD device, a wearable device, a user device, a gyroscope sensor, an accelerometer sensor, a calendar service, an e-mail account, or other data sources. In some aspects, data collection component 214 receives or accesses data continuously, periodically, or as needed.

The tag data can also include a record of audible tags or manual tags applied to videos. The videos and tags can be associated with projects. The projects can be characterized by a project type, project venue, project customer, users, and other characteristics. For example, project types can include construction inspection, sales inspection, training video, maintenance project, and others. In this way, tags used previously on similar projects can be retrieved for suggestion during a future video project. For example, tags used previously at a construction site A owned by company B can be retrieved for use the next time construction site A is inspected or, perhaps when a second construction site owned by company B is inspected.

The contextual data can be associated with individual tags. The contextual data can include location data for a device capturing the video that was tagged. Location data can include gyroscope data, accelerometer data, and other sensor data that may be sensed or otherwise detected by a sensor (or other detector) component including data derived from a sensor component associated with the user (including location, motion, orientation, and position). The present location data of a HMD or other device can be used to suggest tags used previously when the HMD (or other capture device) had a similar location profile.

The contextual data associated with tags can be explicitly defined or derived through analysis of tagging operations. For example, previously submitted tags could be associated with the context in which an individual tag is generated. The context can include a project, video, user, location information, time, date, video progress point, and other data. An order and relationship between tags can be reproduced through the contextual data associated with individual tags. The order can be used by the contextual tag component to suggest tags that typically follow recently used tags. An order of tags can also be explicitly defined in advance of a project. The tags can be presented in sequence to a user wearing a HMD device. The tags can follow a recommend workflow and remind the user to tag various events captured by the video. The recommended workflow can be assembled by an outside vendor, stored on a server, and then communicated to the HMD in real-time or in advance of a project.

The workflow can be branched. The HMD device can follow different branches based on the audio tags received. In this way, the audio tags can serve two purposes. First, the tags work to tag the video. Second, the tags serve as a navigation control for the workflow and subsequent tags shown. For example, a tag could be "end inspection on pump B—failure" or "end inspection on pump B—normal." The normal tag could cause one path of a workflow to be followed while the failure tag could cause a second path to be followed. For example, the failure path may cause a series of problems to be selected and then further details or diagnostic tags could be shown.

The tags shown can be dynamically updated as context changes. Less relevant tags can be removed and more relevant tags added.

The audio processing component 216 processes an audio signal and recognizes human speech within the audio signal. The human speech can be converted to text by the audio processing component. The text can then be used to control tagging functions. Alternatively, the speech can be mapped to controls and a control signal generated without converting to text. For example, a "start tag" command could be recognized and a control signal to start tagging can be generated.

The audio signal is received from an audio capture device, such as a microphone integrated with the HMD device 220. The audio capture device can be any type of device, or devices, configured to capture sound, such as, for example, a microphone. Such a microphone could be omnidirectional or directional in nature. Audio capture devices can be configured to capture acoustic signals traveling through the air and convert these acoustic signals into electrical signals. As used herein, reference to an audio signal can refer to either the acoustic signals captured by an audio capture device or the electrical signals that are produced by an audio capture device. The audio signal can be processed with an acoustic model, which identifies sounds within the audio signal. The sounds can then be processed by a language model, which matches the sounds to words, phrases, and or sentences.

The project component 218 can provide an interface for project information, including a list of curated tags associated with the project. The project component 218 can also associate videos generated by the HMD with the project for subsequent retrieval by the HMD, a different HMD, or another computing device. The project component 218 can store tagged videos and retrieve tagged videos based on a project designation. The project component 218 can accept a list of curated tags generated by a user for a project. The curated list can include an order of tagging, including nested tags. Nested tags have a hierarchical organization. For example, tags associated with a particular level on the radio tower 110, a room in a building, the floor of a building, or some other area could be grouped together. As mentioned, the tags received can be used to navigate to different tags, including by navigating different branches of the hierarchical organization. The tags can be saved with associated contextual data that helps the tags be retrieved at an appropriate point in the future through a contextual analysis. For example, location and orientation information could be associated with the tags to allow retrieval of a tag when a capture device has a location and orientation similar to those associated with the tag.

The contextual tag component 219 generates a list of tags that can be output for display to a user. As mentioned, videos capturing a construction inspection or other operation may be tagged for navigational purposes. The tagging may need to follow a specific schema, rather than a freestyle approach, in order to facilitate subsequent navigation of a recorded video or satisfy the requirements of an inspection project. The list of tags can show the tags most likely to be appropriate for a given context.

The contextual tag component 219 can generate a tag list in response to a request or automatically. The request can be generated by a tagging component upon the occurrence of a trigger, such as receiving a tag initiation command from a user. In this scenario, the user can speak a tag initiation command. In response, tags will be suggested. The user can then speak the displayed tag and/or speak an indication associated with the display of the tags (e.g., "first tag"). Alternatively, a list of potentially relevant tags is displayed upon activation of tagging function, selection of a project with associated tags, detection of contextual information indicating the user is likely to tag a video, or though other triggers. Once activated, the tags shown can be dynamically updated as context changes to show the most relevant tags. A user can request an updated list or the next most relevant tags by speaking an audible command, such as "show more tags."

Several methods of generating the list are possible. The starting point can be a list of available tags. In one aspect, the available tags are ranked by likelihood of use. In one aspect, the most frequently used tags are displayed. The most frequently used tags can be determined by analyzing tag data for previously tagged videos. Tags from videos that share characteristics (e.g., location, project, user, company, venue) can be given more weight when determining the most likely tags to be used. In one aspect, world of available tags is narrowed by project. For example, only tags associated with an active project indicated by a user (or some other indication, such as location) are available for display. Contextual information associated with the tag can be also be used to select the tag. Contextual information is used by matching current contextual information with the contextual information associated with the tag.

The tag shown on the display and/or spoken by the user does need to match the tag actually added to the video. For example, the tags suggested to the user can be shorthand for the actual tag applied to the video upon speaking the tag. This is especially the case when a curated list of tags is used. However, even when the tag is not from a curated list, shorthand or shortcuts for common tags can be used.

Some tags shown can be persistent tags. A persistent tag requires acknowledgement through use or through dismissal. The tag will remain displayed as a suggested tag until it is used to tag the video or dismissed. The persistent tag can be differentiated from other tags by a different appearance, such as a different font size, color, or such. One example of a persisted tag can be an "end" tag for a duration type tagging. As mentioned, tags can be for a point in time or duration of video. The duration tagging can use a start and end command. Once a start tagging command is used a counterpart end tagging tag may be shown as a persistent tag or as a suggested tag.

FIG. 3 shows an exemplary embodiment of a HMD device 320, in accordance with some implementations of the present disclosure. HMD device 320 is a wearable device and may include similar features to that of computing device 1000 of FIG. 10. HMD device 320 may be similar to HMD device 220 of FIG. 2. HMD device 320 includes a frame member 322. Frame member 322 may be a frame structure. As shown in FIG. 3, frame member 322 is configured and arranged for wearing by a user. For instance, frame member 322 may be worn about the user's head. HMD device 320 may additionally include one or more stabilizing members 324 (or stabilizing structures) that stabilize the frame member 322 about the user's head.

HMD device 320 may include one or more rotating members, such as but not limited to first rotating member 326 and second rotating member 328. As discussed in conjunction with FIGS. 4A-4B, at least one rotating members 326 or 328 is rotatably coupled to frame member 322, i.e. at least one of rotating members 326 or 328 is coupled to frame member and configured and arranged for rotating relative to frame member 322. In at least one embodiment, first rotating member 326 may be a boom arm that is coupled to a display module 330. Display module 330 houses a display device (not shown in FIG. 3) that is directed towards the eyes of the users. As shown in FIG. 3, the display device is within the user's line-of-sight (LOS). As discussed in conjunction with FIGS. 4A-4B, the user may re-position the display device, via a rotation of one or more of rotating members 326/328, such the display device is excluded from the user's LOS. Note that in the view of HMD device 320 shown in FIG. 3, the display device is occluded by external surfaces display module 330.

HMD device 320 includes various electroacoustic transducers (e.g. microphones and audio speakers). One such electro acoustic transducer 332 is located near a distal end of rotating member 326. Electroacoustic transducer 332 may be a primary microphone. In various embodiments, HMD device 320 includes one or other electroacoustic transducers, including but not limited to one or more auxiliary microphones 334 and one or more audio speakers, such as but not limited to audio speaker 336.

HMD device 320 may include an optical module 340 that houses one or more photon-detectors (e.g. camera devices), such as photon-detector 342 and a projection system 344. Projection system 344 may include one or more photon-emitters (e.g. scanning lasers, scanning light emitting diodes (LED), and the like). Optical module 340 may be configured and arranged to rotate relative to frame member 322, such that the field-of-view (FOV) of the photon-detector 342 may be rotationally varied. In at least some rotational orientations of optical module 340, the FOV of photon-detector 342 is at least similar to the FOV of the user.

FIG. 4A shows an exemplary embodiment of HMD device 420, where the position of the display device is within the LOS of the user. FIG. 4B shows the HMD device 420 of FIG. 4A, where the position of the display device is outside the LOS of the user. In the various embodiments, when the display device is positioned such as that shown in FIG. 4A, HMD device 420 may be operated in a first operational mode (e.g. a display mode). When the display device is positioned outside of the user's line-of-sight (LOS) (such as that shown in FIG. 4B), HMD device 420 is operated in a second operational mode (e.g. a projection mode).

HMD device 420 includes frame member 422, first rotating member 226, and second rotating member 428. HMD device 420 includes primary microphone 432 and multiple auxiliary microphones 434, as well as one or more audio speakers 436. Furthermore, HMD device 420 includes one or more cameras 442 and projection system 444. Projection system 444 may include one or more photon-emitters, such as but not limited to scanning laser sources and/or scanning LEDs. Camera 442 may be a photon-detector. Display module 440 houses the display device that is directed towards the eyes of the user. Note that in the view of HMD device 420 shown in FIGS. 4A-4B, the display device is occluded by external surfaces display module 440.

As noted above, FIG. 4A shows that display module 440 may be positioned such that the display device is within the line-of-sight (LOS) of the user. A comparison of FIG. 4B with FIG. 4A shows that at least one of first rotating member 426 and/or second rotating member 428 can be rotated, relative to frame member 422, such that the display device is outside of (or excluded from) the LOS of the user. More particularly, second rotating member 428 is rotatably coupled to frame member 422 via a first rotational joint 454 and first rotating member 426 is rotatably coupled to second rotating member 428 via a second rotational joint 452.

Thus, by varying at least one or a first rotational orientation between the frame member 422 and the second rotating member 428 and/or a second rotational orientation between the second rotating member 428 and the first rotating member 426, a user may rotate the position of the display axis about an axis relative to their head.

More particularly, by rotating the position of the display (about the axis relative to their head), the user may selectively position the display module 440 such that the display device is within their LOS. Similarly, the user may selectively position the display module 440 such that the display device is outside of (or excluded from) from their LOS by varying the first rotational orientation between the frame member 422 and the second rotating member 428 and/or the second rotational orientation between the second rotating member 428 and the first rotating member 426. Note that by varying the first rotational orientation, a first angle between the frame member 422 and the second rotating member 428 is varied. Similarly, varying the second rotational orientation generates a variance in a second angle between the second rotating member 428 and the first rotating member 426. Further note that by varying at least one of the first or the second angle generates a variance in an angle between the display device and the frame member 422.

Whether the display device is within or outside the LOS of the user may be determined based on at least one of a first angle (i.e. the angle between frame member 422 and second rotating member 428), the second angle (i.e. the angle between second rotating member 428 and first rotating member 426), and/or the lengths of first/second rotating members 426/428. In various embodiments, one or more sensors are included in first rotational joint 454 to automatically detect and/or determine the first angle. Similarly, one or more sensors may be included in second rotational joint to automatically determine the second angle. Such sensors may include, but are not otherwise limited to Hall Effect sensors and/or Hall Effect switches. According whether the display device is within or excluded from the user's LOS may be automatically determined based on one or more signals generated by sensors that are employed to detect a relative rotation and/or an angle between multiple members of a wearable device, such as but not limited to HMD device 420.

HMD device 420, as shown in FIGS. 4A-4B, is a non-limiting embodiment, and transitioning and/or repositioning a display device within and out of the user's LOS may be accomplished via configurations other than relative rotations and/or rotational orientations of frame member 422, first rotating member 426, and second rotating member 428. Note that first and second rotating members 426/428 may comprise a rotatable boom arm for supporting the display module 440. Thus, the boom arm may be articulated within and out of the user's LOS. Furthermore, other methods for determining when the display device is within or outside of the user's LOS may be employed for other configurations other than relative rotations between members of HMD device 420. For instance, relative translations between members supporting the display device may be sensed and/or detected.

Figure 5:
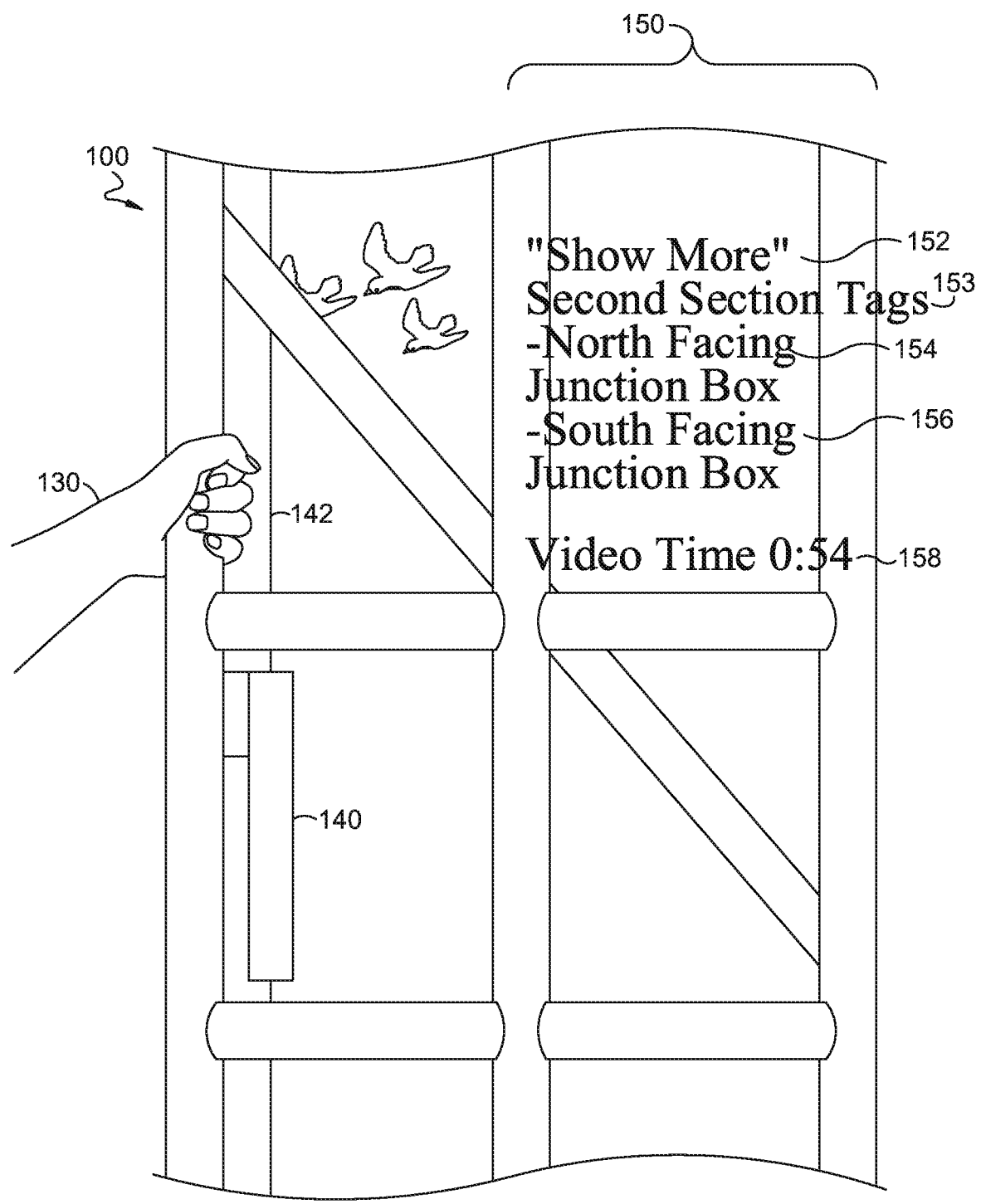
FIG. 5 is a diagram illustrating a tag list, in accordance with some implementations of the present disclosure.

Turning now to FIG. 5, the display of relevant tags in conjunction with a project is illustrated. FIG. 5 shows a scene captured by a camera on a HMD worn by the inspector 118. The scene shows a close up view of radio tower 100 previously illustrated in FIG. 1, The inspector 118 grips the tower 100 with his hand 130 while he is inspecting the conduit 142 and the junction box 140. A list of potential tags 150 is displayed through a HMD device's augmented-reality display. The augmented-reality display does not occlude the environment. Instead, the list appears projected into the environment from a viewer's perspective. The display also includes a video progress indicator 158.

The list 150 includes a suggested control to show more tags 152. Saying, "show more tags" will cause the list to be refreshed with additional tags. For example, the next most relevant tags in a given context can be shown. The list 150 includes a project heading 153 indicating the tags are associated with the second section of the radio tower 110. In one aspect, tags can be retrieved by asking for tags associated with a portion of the project. For example, each section of the radio tower 110 could be associated with a different group of tags. To tags are shown in the list. The first tag is north facing junction box 154 and the second tag is south facing junction box 156. The user can tag a video by saying, "south facing junction box" or "north facing junction box." This is just one example of how a head-mounted display can suggest tags to a user.

The tags can be selected for display based on context. In this case, the overall inspection project can define a curated list of tags for selection. As mentioned, each section of the tower can include a subset of tags. The elevation or other location characteristic of the head-mounted display can be used to suggest tags. Each section of the tower 110 could be associated with elevation that is capable of measure by the head-mounted display. Other context could be recently selected tags. Tags could be associated with an explicit workflow order that allows the next group of tags to be determined. Alternatively, a rough order of tag usage could be determined by analyzing the tags used in similar projects. In this way, the most relevant tags, meaning the tags the user is most likely to use next, can be determined. The rough order of tag usage could be determined through a machine learning method that learns patterns of usage. Each potential tag could be assigned a score that indicates a likelihood of use. Tags with above a threshold likelihood of use could be displayed. Alternatively, a top x number of tags could be displayed. For example, the top three, five, eight, or ten tags could be displayed.

Some tags shown can be persistent tags. A persistent tag requires acknowledgement through use or through dismissal. The tag will remain displayed as a suggested tag until it is used to tag the video or dismissed. The persistent tag can be differentiated from other tags by a different appearance, such as a different font size, color, or such. One example of a persisted tag can be an "end" tag for a duration type tagging. As mentioned, tags can be for a point in time or duration of video. The duration tagging can use a start and end command. Once a start tagging command is used a counterpart end tagging tag may be shown as a persistent tag or as a suggested tag.

Figure 6:
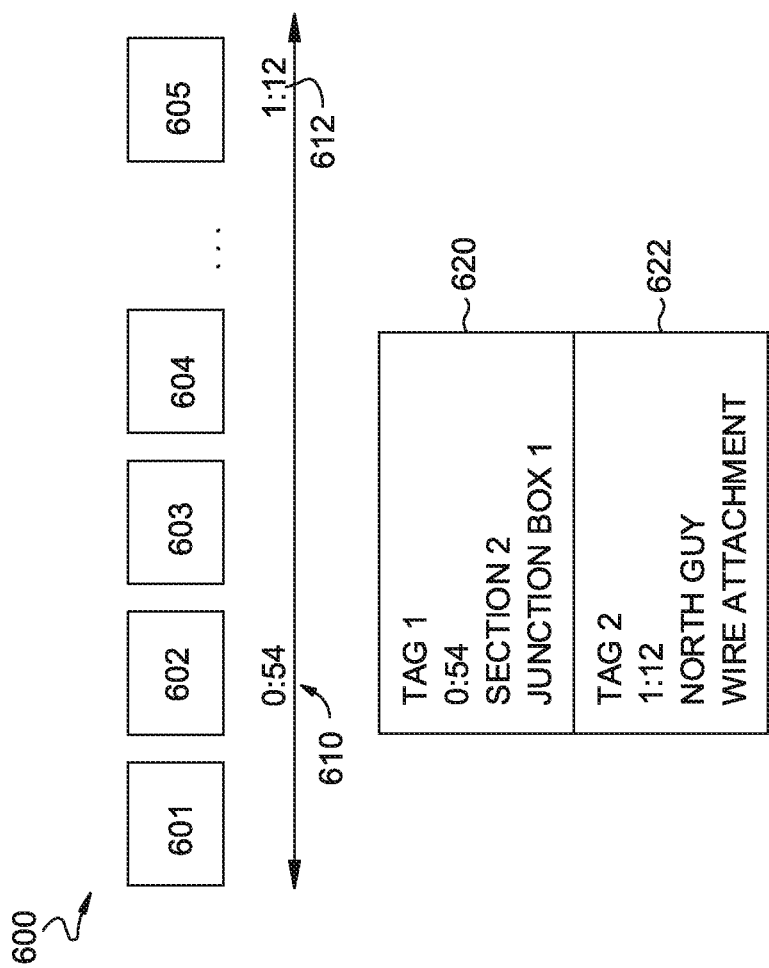
FIG. 6 is a diagram illustrating different tags associated with a video, in accordance with some implementations of the present disclosure.

Turning now to FIG. 6, a tagged video 600 is illustrated. The video comprises frames 601, 602, 603, 604, and 605. In one aspect, a tag is associated with a progress point, such as 0:54 610 or 1:12 612. Each video frame may be uniquely identified, for example, each frame could have a number or progress point. The tag can comprise metadata stored in a separate file that is linked to the progress point. Here two tag entries are shown. The first entry 620 has a tag identification of "section 2 junction box 1" (i.e., section 2 of the radio tower 110), is associated with progress point 0:54, and has a unique ID of tag one. The user could associate this tag with their progress point in a video by speaking, "section 2 junction box 1." The second entry 622 has a tag identification of "north guy wire attachment," a progress point of 1:12 and a unique ID of tag 2. The user could associate this tag with their progress point in a video by speaking, "north guy wire attachment."

The tag shown on the display and/or spoken by the user does need to match the tag actually added to the video. For example, the tags suggested to the user can be shorthand for the actual tag applied to the video upon speaking the tag.

This is especially the case when a curated list of tags is used. However, even when the tag is not from a curated list, shorthand or shortcuts for common tags can be used.

Figure 7:
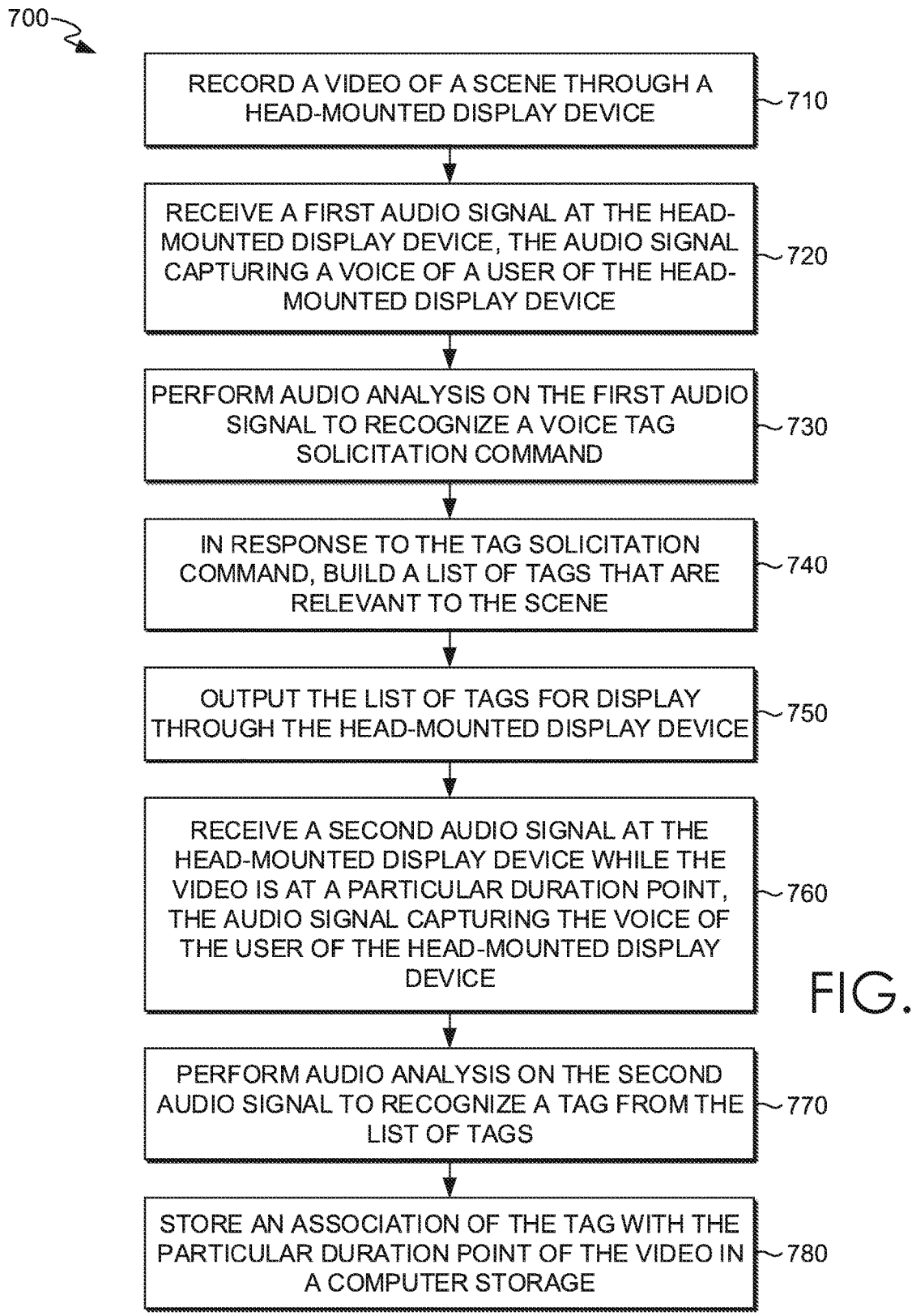
FIG. 7 is a flow diagram showing a method tagging video using audio commands, in accordance with some implementations of the present disclosure.

Turning now to FIG. 7, a method 700 for tagging a video using voice input as the video is being recorded, according to aspects of the technology described herein. Method 900 could be performed by a computing device, such as a head-mounted display device described previously. Aspects of method 900 could be performed by a group of computers working together, as described with reference to FIG. 2.

At step 710, a video of a scene is recorded through a head-mounted display device. The scene is the portion of the real-world captured in the video. The scene comprises objects viewed by the camera. The video can be recorded to computer memory.

At step 720, a first audio signal is received at the head-mounted display device. The audio signal captures a voice of a user of the head-mounted display device. The audio signal can be captured by a microphone associated with the head-mounted display device.

At step 730, audio analysis on the first audio signal is performed to recognize a voice tag-solicitation command. Audio signal processing has been described previously with reference to FIG. 2. Speech processing can be applied to the audio signal to identify the tag-solicitation command. For example, the tag-solicitation command could be, "show tags." The tag-solicitation command can also include additional information that can be used to retrieve relevant tags. For example, the tag-solicitation command could be, "show tags associated with section 2 of the tower to inspection project." The tag-solicitation command could also include a search query. For example, the tag-solicitation command could be, "show junction box tags."

At step 740, in response to the tag solicitation command, a list of tags that are relevant to the scene is built. Methods for returning relevant tags have been described previously with reference to FIG. 2. In one aspect, a subset of curated tags are selected based on contextual information associated with the tags and with the head-mounted display device at the time the tag-solicitation command is received. The list of tags can be dynamically updated as tags are used and/or context changes.

At step 750, the list of tags is output for display through the head-mounted display device. In one aspect, the list of tags are output through an augmented reality display.

At step 760, a second audio signal is received at the head-mounted display device while the video is at a particular duration point. The audio signal captures the voice of the user of the head-mounted display device.

At step 770, audio analysis is performed on the second audio signal to recognize a tag from the list of tags.

At step 780, an association of the tag with the particular duration point of the video is stored in a computer storage, as described with reference to FIG. 6. The tag shown on the display and/or spoken by the user does need to match the tag actually added to the video. For example, the tags suggested to the user can be shorthand for the actual tag applied to the video upon speaking the tag. This is especially the case when a curated list of tags is used. However, even when the tag is not from a curated list, shorthand or shortcuts for common tags can be used. In one aspect, an image of the scene at the particular duration point is also captured and stored. The image can be associated with the tag.

Figure 8:
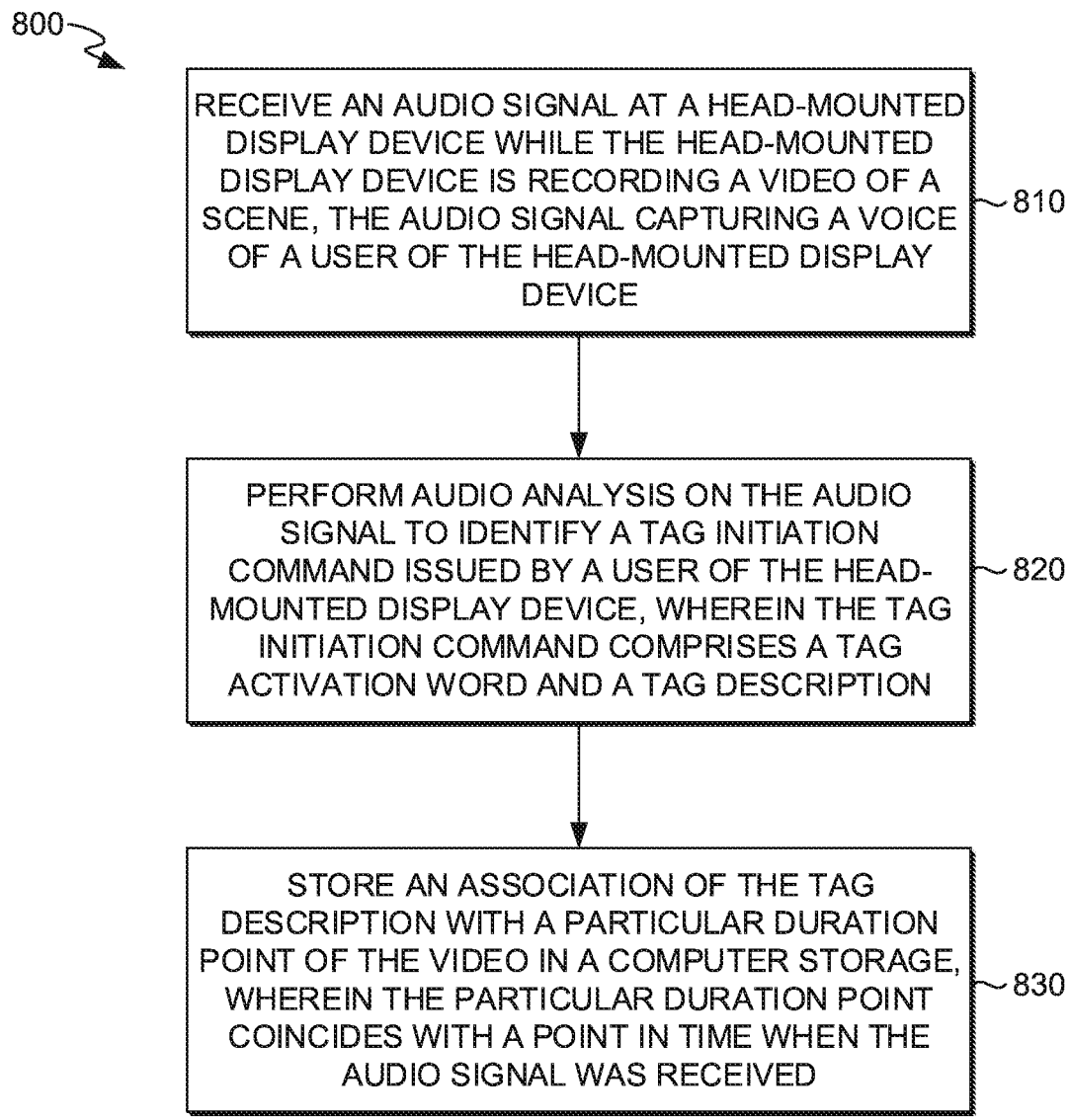
FIG. 8 is a flow diagram showing a method tagging video using audio commands, in accordance with some implementations of the present disclosure.

Turning now to FIG. 8, a method 800 for tagging a video using voice input as the video is being recorded, according to aspects of the technology described herein. Method 900 could be performed by a computing device, such as a head-mounted display device described previously. Aspects of method 900 could be performed by a group of computers working together, as described with reference to FIG. 2.

At step 810, an audio signal is received at a head-mounted display device while the head-mounted display device is recording a video of a scene. The audio signal captures a voice of a user of the head-mounted display device. The audio signal can be received via a microphone associated with the head-mounted display device.

At step 820, audio analysis is performed on the audio signal to identify a tag initiation command issued by a user of the head-mounted display device. The tag initiation command comprises a tag activation word and a tag description. The audio processing can be performed by the head-mounted display device. The tag description can be the name of a tag or some other way to identify a tag. For example, if a list of tags are displayed with numbers/letters delineator, then the delineator could serve as the description. For example, the user could say, "insert tag number 1" or "start tag inspection number 1." In both examples, the "tag" can be the tag activation word.

"Start" is one example of a tagging method command that can be part of the tag initiation command. The "start" method command can initiate tagging a length or duration of video. The start command and can be paired with a stop command to stop the tagging process, such as, "stop tag." The "insert" tagging method command can cause a progress point tag to be inserted. Once a start tagging command is detected, a counterpart end tagging tag may be shown as a persistent tag or as a suggested tag.

In one aspect, only curated tags may be applied to the video. In this implementation, disambiguation of a received tag may be required. For example, the user may not precisely recite the tag identification language. In this situation, the closest tags can be retrieved in the user asked to select one of the suggested tags. The disambiguation interface could also allow the user to request the most relevant tags based on a present context.

At step 830, an association of the tag description with a particular duration point of the video is stored in a computer storage, as described with reference to FIG. 6. The particular duration point coincides approximately with a point in time when the audio signal was received. In one aspect, an image of the scene at the particular duration point is also captured and stored. The image can be associated with the tag.

Figure 9:
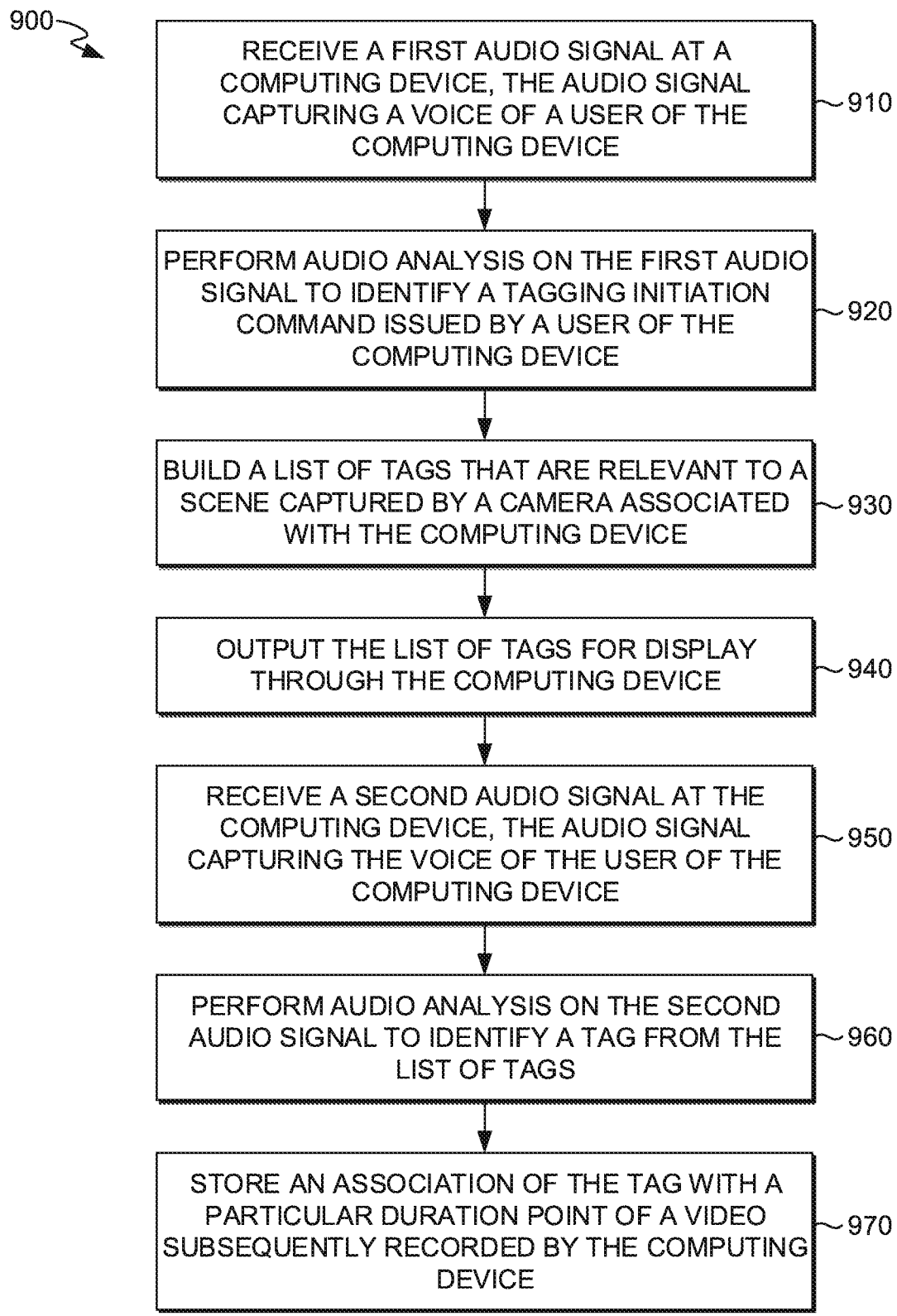
FIG. 9 is a flow diagram showing a method tagging video using audio commands, in accordance with some implementations of the present disclosure.

Turning now to FIG. 9, a method 900 for tagging a video using voice input as the video is being recorded, according to aspects of the technology described herein. Method 900 could be performed by a computing device, such as a head-mounted display device described previously. Aspects of method 900 could be performed by a group of computers working together, as described with reference to FIG. 2.

At step 910, a first audio signal is received at a computing device. The audio signal captures a voice of a user of the computing device.

At step 920, audio analysis is performed on the first audio signal to identify a tagging initiation command issued by a user of the computing device. Audio signal processing has been described previously with reference to FIG. 2. Speech processing can be applied to the audio signal to identify the tagging initiation command. For example, the tag-solicitation command could be, "start maintenance tag." Other examples are possible.

At step 930, a list of tags that are relevant to a scene captured by a camera associated with the computing device is built. This list can be provided without a specific request for relevant tags. In one aspect, a list is generated up receipt of a tag. The list can use the present context of the device to rank the available tags by relevance.

At step 940, the list of tags is output for display through the computing device. This list can be updated as context changes to show the most relevant tags.

At step 950, a second audio signal is received at the computing device. The audio signal captures the voice of the user of the computing device.

At step 960, audio analysis is performed on the second audio signal to identify a tag from the list of tags.

At step 970, an association of the tag with a particular duration point of a video subsequently recorded by the computing device is stored in computer memory. In one aspect, an image of the scene at the particular duration point is also captured and stored. The image can be associated with the tag.

Figure 10:
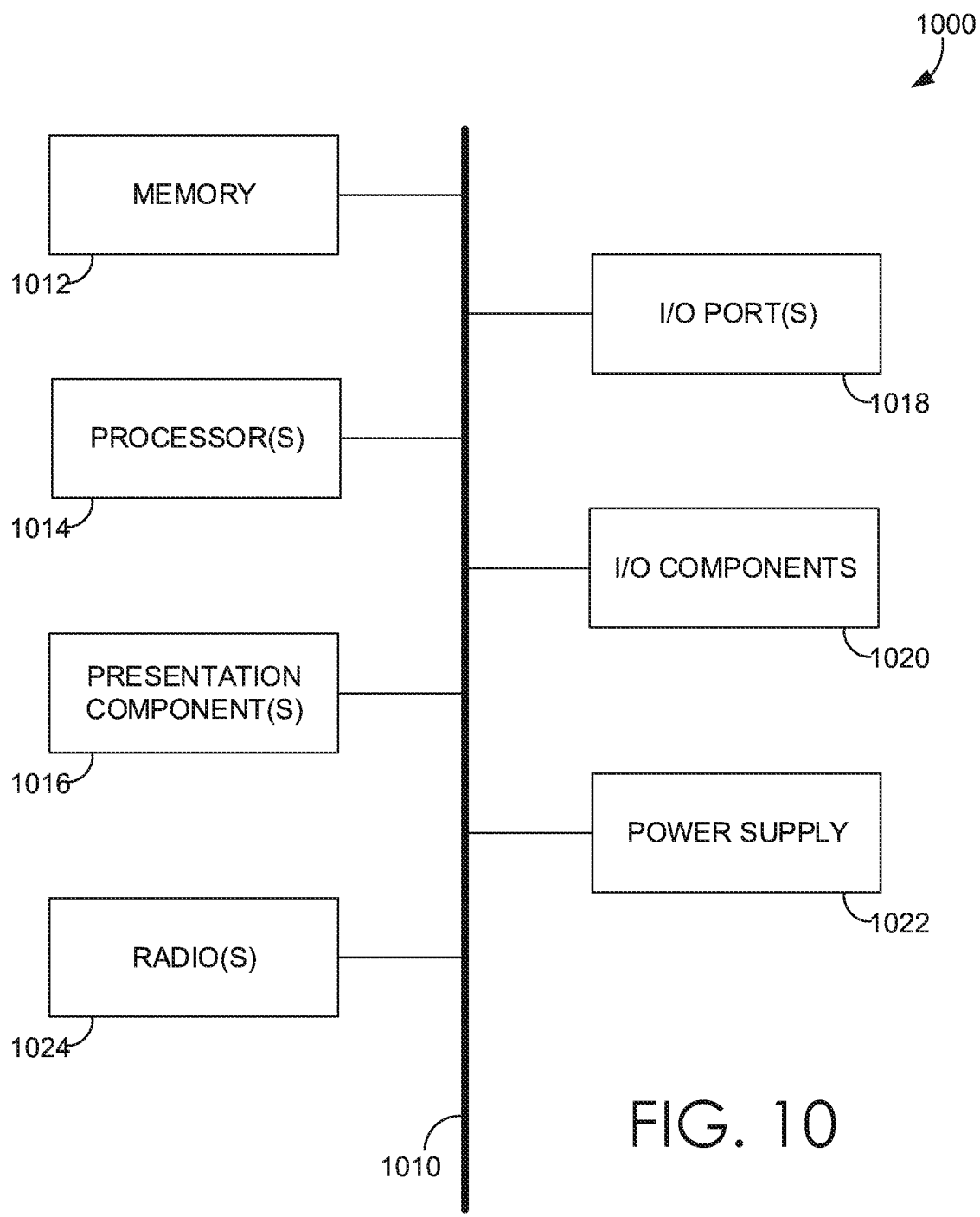
FIG. 10 is a block diagram of an exemplary computing environment suitable for use in accordance with some implementations of the present disclosure.

Having described various embodiments of the invention, an exemplary computing environment suitable for implementing embodiments of the invention is now described. With reference to FIG. 10, an exemplary computing device is provided and referred to generally as computing device 1000. The computing device 1000 is but one example of a suitable computing environment and is not intended to suggest any limitation as to the scope of use or functionality of the invention. Neither should the computing device 1000 be interpreted as having any dependency or requirement relating to any one or combination of components illustrated.

Embodiments of the invention may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the invention may be practiced in a variety of system configurations, including handheld devices, consumer electronics, general-purpose computers, more specialty computing devices, etc. Embodiments of the invention may also be practiced in distributed computing environments where tasks are performed by remote-processing devices that are linked through a communications network. In a distributed computing environment, program modules may be located in both local and remote computer storage media including memory storage devices.

With reference to FIG. 10, computing device 1000 includes a bus 1010 that directly or indirectly couples the following devices: memory 1012, one or more processors 1014, one or more presentation components 1016, one or more input/output (I/O) ports 1018, one or more I/O components 1020, and an illustrative power supply 1022. Bus 1010 represents what may be one or more busses (such as an address bus, data bus, or combination thereof). Although the various blocks of FIG. 10 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 10 is merely illustrative of an exemplary computing device that can be used in connection with one or more embodiments of the present invention. Distinction is not made between such categories as "workstation," "server," "laptop," "handheld device," etc., as all are contemplated within the scope of FIG. 10 and with reference to "computing device."

Computing device 1000 typically includes a variety of computer-readable media. Computer-readable media can be any available media that can be accessed by computing device 1000 and includes both volatile and nonvolatile media, removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 1000. Computer storage media does not comprise signals per se.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 1012 includes computer storage media in the form of volatile and/or nonvolatile memory. The memory may be removable, non-removable, or a combination thereof. Exemplary hardware devices include solid-state memory, hard drives, optical-disc drives, etc. Computing device 1000 includes one or more processors 1014 that read data from various entities such as memory 1012 or I/O components 1020. Presentation component(s) 1016 presents data indications to a user or other device. Exemplary presentation components include a display device, speaker, printing component, vibrating component, and the like.

The I/O ports 1018 allow computing device 1000 to be logically coupled to other devices, including I/O components 1020, some of which may be built in. Illustrative components include a microphone, joystick, game pad, satellite dish, scanner, printer, wireless device, etc. The I/O components 1020 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1000. The computing device 1000 may be equipped with depth cameras, such as stereoscopic camera systems, infrared camera systems, RGB camera systems, and combinations of these, for gesture detection and recognition. Additionally, the computing device 1000 may be equipped with accelerometers or gyroscopes that enable detection of motion. The output of the accelerometers or gyroscopes may be provided to the display of the computing device 1000 to render immersive augmented reality or virtual reality.

Some embodiments of computing device 1000 may include one or more radio(s) 1024 (or similar wireless communication components). The radio 1024 transmits and receives radio or wireless communications. The computing device 1000 may be a wireless terminal adapted to receive communications and media over various wireless networks. Computing device 1000 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the present invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A method of tagging a video using voice input as the video is being recorded comprising:
    recording a video of a scene through a head-mounted display device;
    receiving a first audio signal at the head-mounted display device, the audio signal capturing a voice of a user of the head-mounted display device;
    performing audio analysis on the first audio signal to recognize a voice tag solicitation command;
    in response to the tag solicitation command, building a list of tags that are relevant to the scene;
    outputting the list of tags for display through the head-mounted display device;
    receiving a second audio signal at the head-mounted display device while the video is at a particular duration point, the audio signal capturing the voice of the user of the head-mounted display device;
    performing audio analysis on the second audio signal to recognize a tag from the list of tags; and
    storing an association of the tag with the particular duration point of the video in a computer storage.

2. The method of claim 1, wherein the scene is associated with a project and wherein building the list of tags comprises retrieving tags from a curated list of tags associated with the project.

3. The method of claim 2, further comprising determining a location characteristic of the head-mounted display device and wherein said retrieving tags from the curated list further comprises retrieving tags associated with the location characteristic.

4. The method of claim 3, wherein the location characteristic is a directional orientation of a camera on the head-mounted display.

5. The method of claim 2, wherein the tagging solicitation command includes identification information for the project.

6. The method of claim 1, wherein building the list of tags comprises ranking available tags by likelihood of usage given a present context of the head-mounted display device.

7. The method of claim 6, wherein the likelihood is calculated using a machine learning process that identifies patterns of tag usage given a context.

8. A method of tagging a video using voice input as the video is being recorded comprising:
    receiving an audio signal at a head-mounted display device while the head-mounted display device is recording a video of a scene, the audio signal capturing a voice of a user of the head-mounted display device;
    performing audio analysis on the audio signal to identify a tag initiation command issued by a user of the head-mounted display device, wherein the tag initiation command comprises a tag activation word and a tag description;
    receiving an additional audio signal;
    performing audio analysis on the audio signal to identify a display tag command to show tags;
    building a list of tags that are relevant to the scene;
    outputting the list of tags for display through the head-mounted display device; and
    storing an association of the tag description with a particular duration point of the video in a computer storage, wherein the particular duration point coincides with a point in time when the audio signal was received.

9. The method of claim 8, wherein the tag initiation command also comprises a tagging method.

10. The method of claim 9, wherein the tagging method is a single point tag.

11. The method of claim 9, wherein the tagging method is a duration tag starting at a first progress point in the video and terminating a second progress point in the video.

12. The method of claim 8, wherein building the list of tags comprises ranking available tags by likelihood of usage given a present context of the head-mounted display device.

13. The method of claim 12, wherein the likelihood is calculated using a machine learning process that identifies patterns of tag usage given a context.

14. A computer-storage media having computer-executable instructions embodied thereon that when executed by a computer processor causes a mobile computing device to perform a method of method of tagging a video using voice input as the video is being recorded, the method comprising:
    receiving a first audio signal at a computing device, the audio signal capturing a voice of a user of the computing device;

performing audio analysis on the first audio signal to identify a tagging initiation command issued by a user of the computing device;

building a list of tags that are relevant to a scene captured by a camera associated with the computing device;

outputting the list of tags for display through the computing device;

receiving a second audio signal at the computing device, the audio signal capturing the voice of the user of the computing device;

performing audio analysis on the second audio signal to identify a tag from the list of tags; and storing an association of the tag with a particular duration point of a video subsequently recorded by the computing device.

15. The media of claim 14, wherein building the list of tags comprises ranking available tags by likelihood of usage given a context of the head-mounted display device.

16. The media of claim 15, wherein the likelihood is calculated using a machine learning process that identifies patterns of tag usage for the given a context.

17. The media of claim 15, wherein the given context is a previous tag added to the video through an audible command.

18. The media of claim 15, wherein the method comprises updating the list of tags dynamically as the given context changes, wherein updating the list comprises removing tags that have become less relevant and adding tags with increased relevance.

* * * * *